ZZZ# 3,776,934
METHYLVINYLDI-(-N-METHYLACETAMIDO) SILANE

Louis H. Toporcer, Ingersol Township, Midland County, and Joseph N. Clark, Midland, Mich., assignor to Dow Corning Corporation, Midland, Mich.
No Drawing. Filed Sept. 29, 1972, Ser. No. 293,607
Int. Cl. C07f 7/10
U.S. Cl. 260—448.2 N     1 Claim

ABSTRACT OF THE DISCLOSURE

Methylvinyldi-(-N-methylacetamido)silane is useful as a chain extender in making low modulus room temperature vulcanizable silicone elastomers possessing fast cure and adhesion to substrates.

---

This invention relates to methylvinyldi-(-N-methylacetamido)silane.

Amidosilanes are known in the art as shown by Gölitz in U.S. Pat. No. 3,417,047. Gölitz teaches triamidosilanes as crosslinking agents for making elastic compositions which cure at room temperature. Klebe in U.S. Pat. No. 3,488,371 teaches the following diamidosilanes $(CH_3)_2Si\{N(CH_3)C(O)CH_3\}_2$, $(CH_3)(C_6H_5)Si\{N(CH_3)C(O)CH_3\}_2$, $(C_6H_5)_2Si\{N(CH_3)C(O)CH_3\}_2$ and

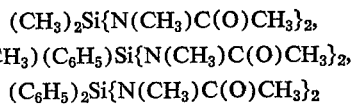

Hurwitz et al. in U.S. Pat. No. 2,876,234 teaches a broad class of amidosilanes of the formula $(R^0)_{4-x}Si\{N(R^4)C(O)R^5\}_x$ wherein $R^0$ is cyclohexyl, cyclohexenyl, phenyl, alkenyl or alkyl having 1 to 18 carbon atoms, $R^4$ is hydrogen, alkyl or alkenyl having 1 to 18 carbon atoms, $R^5$ is hydrogen, cyclohexyl, phenyl, alkenyl or alkyl having 1 to 18 carbon atoms and $x$ is 1 to 4.

Although many of the amidosilanes are known, the present invention relates to a silane not specifically disclosed in the prior art and which has unique properties.

It is therefore an object of the present invention to provide an amidosilane having unique properties when used in organosiloxane compositions as a chain extender.

The present invention relates to methylvinyldi-(-N-methylacetamido)silane.

Methylvinyldi-(-N-methylacetamido)silane can be prepared by methods known in the art. However, the preferred method is one described in application Ser. No. 293,606 by Louis H. Toporcer and Irvin D. Crossan entitled "Method of Preparing Amidosilanes" filed on Sept. 29, 1972. With the preferred method, methylvinyldichlorosilane is slowly added to a solution of sodium N-methylacetamide in an anhydrous inert organic solvent, such as toluene and then refluxed for about one hour. The by-produced sodium chloride is filtered from the cooled product mixture and then the solvent is vacuum stripped from the filtrate to yield the methylvinyldi-(-N-methylacetamido)silane in a purity of greater than 98 percent.

The methylvinyldi-(-N-methylacetamido)silane has unique properties when used as a chain extender in certain room temperature vulcanizable silicone elastomer compositions. The methylvinyldi-(-N-methylacetamido)silane should be stored under anhydrous conditions because it is sensitive to moisture and will hydrolyze in contact with moisture or water.

Room temperature vulcanizable silicone elastomer compositions containing hydroxyl endblocked polydiorganosiloxane, filler, crosslinking agent, for example, multifunctional amidosilanes or aminoxy siloxanes and methylvinyldi-(-N-methylacetamido)silane exhibit marked improvement in skin-over time and in adhesion of the room temperature vulcanizable silicone elastomer to many substrate surfaces when compared to other difunctional amidosilanes, such as dimethyldi-(-N-methylacetamido)silane. The room temperature vulcanizable silicone elastomers also have consistently dry surfaces on cure when methylvinyldi-(-N-methylacetamido)silane is used compared to tacky surface for many room temperature vulcanizable silicone elastomers which contain dimethyldi-(-N-methylacetamido)silane. For example, the skin-over time is reduced from 60 to 85 percent when methylvinyldi-(-N-methylacetamido)silane is used compared to when dimethyldi-(-N-methylacetamido)silane is used. Significant improvement in adhesion of the cured room temperature vulcanizable silicone elastomer containing the methylvinyldi-(-N-methylacetamido)silane to aluminum, marble, concrete, wood and brick is observed over the same room temperature vulcanizable silicone elastomer composition except the methylvinyldi-(-N-methylacetamido)silane is replaced by dimethyldi-(-N-methylacetamido)silane. When glass is the substrate, the adhesion is about the same regardless of the silane used.

The methylvinyldi-(-N-methylacetamido)silane of the present invention is an effective chain extender in room temperature vulcanizable silicone elastomer compositions. Chain extension, as used herein, means that the molecular weight of the polydiorganosiloxane is effectively increased as observed from the properties of the cured silicone elastomer, such as by higher elongation and lower modulus compared to compositions using the same molecular weight polydiorganosiloxane but without the chain extender. The methylvinyldi-(-N-methylacetamido)silane is a chain extender which functions in compositions during the curing or crosslinking process of the silicone elastomer compositions, as opposed to many materials which can merely be used to couple molecules together in uncuring situations. The methylvinyldi-(-N-methylacetamido)silane of the present invention may be termed an "in situ chain extender."

The following example is for illustrative purposes only and should not be construed as limiting the invention which is properly delineated in the claim.

EXAMPLE

Preparation of the sodium salt of N-methylacetamide.—To 1500 ml. of dry toluene in a five-liter flask equipped with a stirrer, nitrogen sweep, condenser and addition funnel, 50 g. (2.1 atoms) of sodium metal was added. This mixture was heated to reflux to make sodium sand and at the same time the addition of N-methylacetamide (174 g., 2.2 moles) was started. The addition of the N-methylacetamide was complete in 40 minutes with a slight change in color from yellow to light gray yellow observed. No exothermic reaction was observed but gas evolution was observed. After the addition of the N-methylacetamide, the reaction mixture was refluxed for several hours until the sodium metal had disappeared and the gas evolution was no longer evident. The mixture was then cooled. The resulting product was a toluene suspension of the sodium N-methylacetamide,

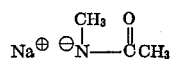

Preparation of methylvinyldi-(-N-methylacetamido)silane.—In a flask equipped as above, 250 g. of toluene slurry containing 41 weight percent of sodium-N-methylacetamide was placed in the flask with 300 g. of dry toluene. Over a 5 to 10 minute period, 70 g. (0.5 mole) of methylvinyldichlorosilane was added. The reaction mixture was cooled during the addition by placing the flask in an ice-water bath. After the addition of the silane was complete, the mixture was heated to reflux and maintained at reflux for one hour. The mixture was then cooled to room temperature and the by-produced sodium chloride was removed by passing the mixture through a filter containing filter aid. The salt filter cake was washed once with toluene and the wash was combined with the filtrate. The toluene solvent was removed from the filtrate by using a vacuum evaporator. The resulting product was 99.5 g. of methylvinyldi-(-N-methylacetamido)silane,

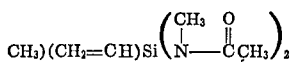

a 93 percent yield and the boiling point range was 85 to 88° C. at <1 mm. of Hg. Analysis by gas liquid chromatography showed a greater than 98 percent purity.

Preparation of dimethyldi-(-N-methylacetamido)silane.—To the quantity of cooled sodium-N-methylacetamide solution prepared as described above, 129 g. (1.0 mole) of dimethyldichlorosilane was added over a 15 minute period with an ice-water bath providing external cooling. The mixture was then allowed to stand overnight. The by-produced sodium chloride was removed by passing the mixture through a filter containing a filter aid and then the toluene was removed by vacuum distillation. The silane product was distilled wherein the maximum pot temperature was 140° C. to yield 135 g. (68%) of dimethyldi-(-N-methylacetamido)silane,

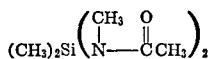

The dimethyl-(-N-methylacetamido)silane had a boiling point range of 87 to 92° C. at 1 mm. of Hg.

Preparation of methyltris-(-N-methylacetamido)silane and vinyltris-(-N-methylacetamido)silane.—Both the methyltris-(-N-methylacetamido)silane and the vinyltris-(-N-methylacetamido)silane were prepared in the manner described above for the preparation of methylvinyldi-(-N-methylacetamido)silane except in place of the methylvinyldichlorosilane, methyltrichlorosilane and vinyltrichlorosilane were used respectively.

Poly(N,N - diethylaminoxy)polysiloxane. — The polyfunctional N,N-diethylaminoxy polysiloxane crosslinker was prepared by adding diethyl hydroxylamine to a trimethylsiloxy endblocked polymethylhydrogensiloxane copolymer having about ten silicon atoms per molecule and having an average of five methylhydrogensiloxane units and three dimethylsiloxane units per molecule, in a ratio of one mole of diethylhydroxylamine per silicon-bonded hydrogen atom of the polymethylhydrogensiloxane. After one hour, a slight excess of the diethylhydroxylamine was added and the mixture was allowed to stand until the gas evolution ceased. The reaction was exothermic and was externally cooled. The resulting product was a trimethylsiloxy endblocked polysiloxane having per molecule about 5 units of the formula $(CH_3)\{(C_2H_5)_2NO-\}SiO$ and about 3 units of $(CH_3)_2SiO$.

Room temperature vulcanizable silicone elastomers.—The compositions were prepared by thoroughly mixing the polymer and calcium carbonate filler, deairing the mixture, then adding a mixture of the difunctional silane and polyfunctional silane and thoroughly mixing the silanes into the mixture under anhydrous conditions. After the ingredients were thoroughly mixed, the resulting room temperature vulcanizable silicone elastomer compositions were placed in moisture-tight tubes. The compositions were formed into standard test pieces and cured by exposure to air at 25° C. and 50 percent relative humidity for 7 days. The properties were obtained by using the following test: durometer was determined by ASTM–D–2240 and the results were obtained on the Shore A Scale; tensile strength and elongation at break were determined by ASTM–D–412–68 and the results were obtained in pounds per square inch and percent respectively; tear strength, Die B, was determined by ASTM–D–624–54 and the results were obtained in pounds per inch; the 150% modulus was determined by the procedure for tensile strength and the results were obtained in pounds per square inch; the adhesion was determined by placing a bead of the composition on a substrate surface, the composition cured, a small tab of the cured elastomer was made by slicing under one end of the cured bead with a razor blade and then the tab was pulled and it was observed if the failure was adhesive or cohesive and the amount of cohesive failure determined by the appearance of the newly-exposed substrate surface; and the skin-over time was determined by depositing a bead of the composition, exposing it to the curing conditions and observing the time lapsed between the time the bead was deposited and the time the surface became non-tacky to the touch of a finger gently brought in contact with the surface of the bead.

The ingredients for the room temperature vulcanizable compositions were as indicated below:

(A)

100 parts by weight of a hydroxyl endblocked polydimethylsiloxane having a viscosity of about 4,000 cs. at 25° C., 110 parts by weight of a finely divided calcium carbonate filler, 5 parts by weight of methylvinyldi-(-N-methylacetamido) silane, and 1 part by weight of methyltris-(-N-methylacetamido) silane.

(B) Same as composition (A) above except dimethyldi (-N-methylacetamido)silane was substituted for the methylvinyldi-(-N-methylacetamido)silane.

(C) Same as composition (A) above except 6 parts by weight of the methylvinyldi-(-N-methylacetamido)silane was used instead of 5 parts by weight.

(D) Same as composition (C) above except dimethyldi-(-N-methylacetamido)silane was substituted for the methylvinyldi-(-N-methylacetamido)silane.

(E) Same as composition (A) above except vinyltris-(-N-methylacetamido)silane was substituted for the methyltris-(-N-methylacetamido)silane.

(F) Same as composition (E) above except dimethyldi-(-N-methylacetamido)silane was substituted for the methylvinyldi-(-N-methylacetamido)silane.

(G) Same as composition (E) above except 6 parts by weight of the methylvinyldi-(-N-methylacetamido) silane were used instead of 5 parts by weight.

(H) Same as composition (G) above except dimethyldi-(-N-methylacetamido)silane was substituted for the methylvinyldi-(-N-methylacetamido)silane.

(I) Same as composition (E) above except 7 parts by weight of the methylvinyldi-(-N-methylacetamido)silane were used instead of 5 parts by weight.

(J) Same as composition (I) above except dimethyldi-(-N-methylacetamido)silane was substituted for the methylvinyldi-(-N-methylacetamido)silane.

(K) Same as composition (I) above except 1.5 parts by weight of the poly(N,N-diethylaminoxy)polysiloxane as prepared above was substituted for the 1 part by weight of the vinyltris-(-N-methylacetamido)silane.

(L) Same as composition (K) above except dimethyldi-(-N-methylacetamido)silane was substituted for the methylvinyldi-(-N-methylamido)silane.

The properties were as shown in the following table:

| Room temperature vulcanizable silicone elastomer composition | Skin-over time, min. | Durometer Shore A, scale | Tensile strength at break, p.s.i. | Elongation at break, percent | Tear strength Die B, p.p.i. | 150% modulus, p.s.i. | Adhesion, percent cohesive failure substrate | | | | | |
|---|---|---|---|---|---|---|---|---|---|---|---|---|
| | | | | | | | Aluminum | Glass | Marble | Concrete | Wood | Brick |
| A | 17 | 14 | 60 | 1,450 | | 20 | | | | | | |
| B¹ | 60 | | Too tacky to measure properties ² | | | | | | | | | |
| C | 10 | 10 | 65 | 1,500 | | 20 | | | | | | |
| D¹ | 60 | | Too tacky to measure properties ² | | | | | | | | | |
| E | 11 | 17 | 56 | 1,025 | | 31 | | | | | | |
| F¹ | 30 | 3 | 50 | 1,700 | 16 | 11 | | | | | | |
| G | 10 | 10 | 62 | 1,150 | 18 | 24 | | | | | | |
| H¹ | 55 | 15 | Too tacky to measure other properties ² | | | | | | | | | |
| I | 11 | 14 | 48 | 1,175 | | 23 | | | | | | |
| J¹ | 50 | 10 | Too tacky to measure other properties ² | | | | | | | | | |
| K | 25 | 15 | 93 | 1,550 | 19 | 34 | 100 | 100 | 50 | 100 | 50 | 100 |
| L¹ | 65 | 13 | 65 | 900 | 16 | 35 | 0 | 100 | 0 | 50 | 0 | |

¹ Presented for comparative purposes.
² The tackiness did not appear to decrease after two weeks' exposure to the curing conditions.

That which is claimed is:
1. Methylvinyldi-(-N-methylacetamido)silane.

References Cited

UNITED STATES PATENTS

| | | | |
|---|---|---|---|
| 2,876,234 | 3/1959 | Hurwitz et al. | 260—448.2 N X |
| 3,417,047 | 12/1968 | Golitz et al. | 260—448.2 N X |
| 3,440,261 | 4/1969 | Saam | 260—448.2 N |
| 3,453,233 | 7/1969 | Flatt | 260—448.2 Q X |
| 3,488,371 | 1/1970 | Klebe | 260—448.2 N |

DANIEL E. WYMAN, Primary Examiner

P. F. SHAVER, Assistant Examiner

U.S. Cl. X.R.

117—121, 124 F, 135.1, 147; 260—46.5 G, 46.5 R, 448.2 Q